(12) United States Patent
Uhlhorn et al.

(10) Patent No.: US 7,616,851 B1
(45) Date of Patent: Nov. 10, 2009

(54) TUNABLE WAVELENGTH FILTER DEVICE

(75) Inventors: Brian L. Uhlhorn, St. Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/146,756

(22) Filed: Jun. 26, 2008

(51) Int. Cl.
G02B 6/34 (2006.01)

(52) U.S. Cl. .......................... 385/37; 359/34

(58) Field of Classification Search .................. 385/10, 385/12, 14, 16, 24, 37, 122, 132
See application file for complete search history.

(56) References Cited

U.S. PATENT DOCUMENTS

| | | | |
|---|---|---|---|
| 4,978,187 A * | 12/1990 | Minemura et al. ............ 385/14 |
| 5,020,153 A * | 5/1991 | Choa et al. .................. 398/138 |
| 5,396,323 A * | 3/1995 | Abbott et al. .............. 356/73.1 |
| 5,473,722 A * | 12/1995 | Sohler et al. ................ 385/132 |
| 5,488,681 A * | 1/1996 | Deacon et al. ................ 385/37 |
| 5,491,762 A * | 2/1996 | Deacon et al. ................ 385/16 |
| 5,506,920 A | 4/1996 | Suemura et al. |
| 5,630,004 A * | 5/1997 | Deacon et al. .............. 385/129 |
| 5,652,817 A * | 7/1997 | Brinkman et al. ............. 385/37 |
| 5,729,641 A * | 3/1998 | Chandonnet et al. ........... 385/2 |
| 5,732,177 A * | 3/1998 | Deacon et al. .............. 385/122 |
| 5,781,670 A * | 7/1998 | Deacon et al. .............. 385/10 |
| 5,799,121 A * | 8/1998 | Duck et al. .................. 385/47 |
| 5,832,156 A * | 11/1998 | Strasser et al. ................ 385/48 |
| 5,835,458 A * | 11/1998 | Bischel et al. ........... 369/44.12 |
| 5,836,669 A * | 11/1998 | Hed ........................... 362/92 |
| 5,847,855 A * | 12/1998 | Choa .......................... 398/135 |
| 5,850,302 A * | 12/1998 | Strasser et al. ................ 398/93 |
| 5,852,688 A * | 12/1998 | Brinkman et al. ............. 385/16 |
| 5,854,864 A * | 12/1998 | Knoesen et al. ............... 385/30 |
| 6,047,095 A * | 4/2000 | Knoesen et al. ............... 385/30 |
| H1911 H * | 11/2000 | Land ........................ 264/1.36 |
| 6,241,397 B1 * | 6/2001 | Bao et al. ..................... 385/73 |
| 6,243,517 B1 * | 6/2001 | Deacon ....................... 385/50 |
| 6,330,388 B1 * | 12/2001 | Bendett et al. ............. 385/132 |
| 6,339,486 B1 * | 1/2002 | Popovich ..................... 359/15 |
| 6,348,683 B1 * | 2/2002 | Verghese et al. ......... 250/214.1 |
| 6,356,679 B1 * | 3/2002 | Kapany ....................... 385/18 |
| 6,393,172 B1 * | 5/2002 | Brinkman et al. ............. 385/16 |
| 6,426,811 B1 * | 7/2002 | Popovich et al. ............. 359/15 |
| 6,459,533 B1 * | 10/2002 | Clapp et al. ................. 359/578 |
| 6,490,381 B1 * | 12/2002 | Adair et al. ................... 385/16 |
| 6,522,795 B1 * | 2/2003 | Jordan et al. ................. 385/10 |
| 6,538,775 B1 * | 3/2003 | Bowley et al. ................ 359/3 |
| 6,567,573 B1 * | 5/2003 | Domash et al. ............... 385/16 |

(Continued)

Primary Examiner—Frank G Font
Assistant Examiner—Peter Radkowski
(74) Attorney, Agent, or Firm—Hamre, Schumann, Mueller & Larson, P.C.

(57) ABSTRACT

A tunable wavelength filter device that includes a light wave circuit having an input light wave path, an output light wave path, and a plurality of reflector elements between the input light wave path and the output light wave path that separate one or more wavelengths of an inputted light wave spectrum. A tuner component is positioned on the light wave circuit between the input light wave path and the output light wave path. The tuner component has an index of refraction that is chosen so as to alter the path of the light wave so that the resulting wavelength of the light wave that is output from the device is the desired wavelength.

17 Claims, 3 Drawing Sheets

U.S. PATENT DOCUMENTS

| | | | |
|---|---|---|---|
| 6,639,712 B2 * | 10/2003 | McBride et al. | 359/298 |
| 6,639,733 B2 * | 10/2003 | Minano et al. | 359/728 |
| 6,661,495 B1 * | 12/2003 | Popovich | 349/193 |
| 6,678,078 B1 * | 1/2004 | Popovich et al. | 359/15 |
| 6,823,115 B2 * | 11/2004 | Greiner et al. | 385/37 |
| 6,829,417 B2 * | 12/2004 | Greiner et al. | 385/37 |
| 6,844,946 B2 | 1/2005 | Buse et al. | |
| 6,965,464 B2 * | 11/2005 | Mossberg | 359/34 |
| 6,993,223 B2 * | 1/2006 | Greiner et al. | 385/37 |
| 7,018,563 B1 * | 3/2006 | Sutherland et al. | 252/299.01 |
| 7,054,517 B2 * | 5/2006 | Mossberg et al. | 385/14 |
| 7,072,020 B1 * | 7/2006 | Sutherland et al. | 349/201 |
| 7,123,794 B2 * | 10/2006 | Greiner et al. | 385/37 |
| 7,155,089 B1 * | 12/2006 | Chi et al. | 385/30 |
| 7,175,780 B1 * | 2/2007 | Sutherland et al. | 252/299.01 |
| 7,181,103 B1 * | 2/2007 | Greiner et al. | 385/24 |
| 7,184,622 B2 * | 2/2007 | Uhlhorn et al. | 385/24 |
| 7,186,567 B1 * | 3/2007 | Sutherland et al. | 436/532 |
| 7,190,856 B1 * | 3/2007 | Iazikov et al. | 385/24 |
| 7,190,858 B1 * | 3/2007 | Greiner et al. | 385/37 |
| 7,190,859 B2 * | 3/2007 | Greiner et al. | 385/37 |
| 7,193,771 B1 * | 3/2007 | Smith et al. | 359/333 |
| 7,194,164 B2 * | 3/2007 | Iazikov et al. | 385/37 |
| 7,203,401 B2 * | 4/2007 | Mossberg et al. | 385/37 |
| 7,260,290 B1 * | 8/2007 | Greiner et al. | 385/37 |
| 7,327,908 B1 * | 2/2008 | Iazikov et al. | 385/12 |
| 7,330,614 B1 * | 2/2008 | Mossberg et al. | 385/14 |
| 7,333,692 B1 * | 2/2008 | Mossberg et al. | 385/37 |
| 7,359,597 B1 * | 4/2008 | Iazikov et al. | 385/37 |
| 7,413,679 B1 * | 8/2008 | Sutherland et al. | 252/299.01 |
| 2001/0016093 A1 * | 8/2001 | Dawes et al. | 385/14 |
| 2001/0028769 A1 * | 10/2001 | Deacon | 385/50 |
| 2001/0033400 A1 * | 10/2001 | Sutherland et al. | 359/15 |
| 2004/0057091 A1 * | 3/2004 | Popovich et al. | 359/15 |
| 2004/0076374 A1 * | 4/2004 | Greiner et al. | 385/37 |
| 2004/0170356 A1 * | 9/2004 | Iazikov et al. | 385/37 |
| 2004/0179779 A1 * | 9/2004 | Greiner et al. | 385/37 |
| 2005/0002605 A1 * | 1/2005 | Sakai et al. | 385/27 |
| 2005/0143814 A1 * | 6/2005 | Esch et al. | 623/6.22 |
| 2005/0168749 A1 * | 8/2005 | Ye et al. | 356/458 |
| 2005/0232530 A1 * | 10/2005 | Kekas | 385/11 |
| 2005/0254752 A1 * | 11/2005 | Domash et al. | 385/37 |
| 2006/0062518 A1 * | 3/2006 | Galstian et al. | 385/27 |
| 2006/0193553 A1 * | 8/2006 | Mossberg et al. | 385/14 |
| 2006/0210214 A1 * | 9/2006 | Uhlhorn et al. | 385/14 |
| 2006/0232839 A1 * | 10/2006 | Moser et al. | 359/15 |
| 2007/0019910 A1 * | 1/2007 | Greiner et al. | 385/37 |
| 2007/0034730 A1 * | 2/2007 | Mossberg et al. | 244/3.1 |

* cited by examiner

TUNABLE WAVELENGTH FILTER DEVICE

FIELD

This disclosure relates to the field of optical communications. More particularly, this description relates to a tunable wavelength filter device.

BACKGROUND

In optical communications, it is often necessary to have a wavelength filter device that is capable of selecting a specific optical transmission having one or more particular wavelengths from a plurality of wavelengths within a light wave spectrum.

Typically, specific wavelengths within the light wave spectrum are separated out using a thin film filter, a holographic Bragg reflector (HBR), or an array waveguide grating (AWG). A problem with conventional thin film filters, holographic Bragg reflectors, and array waveguide grating devices is that they are manufactured and designed to separate one or more particular wavelengths, i.e. these wavelength filter devices are tuned to specific wavelengths.

In many applications it is often advantageous for the wavelength filter device to be customizable so that different wavelengths can be selected or deselected depending on the desired wavelengths for the particular application. One conventional solution to this problem is a device that contains multiple thin film filter devices that are mechanically rotated to separate out specific wavelengths of the light wave spectrum. Another known solution is a device that separates all wavelengths within a light wave spectrum and uses a cascade of optical switches or attenuators to select the appropriate wavelengths. However, a problem with these wavelength filter devices is that they are typically much larger in size, are more expensive, are less reliable and consume more power than a typical holographic Bragg reflector device or array waveguide grating device.

SUMMARY

This application describes a tunable wavelength filter device that is easily customizable to separate out desired wavelengths within a light wave spectrum that is more reliable, less expensive, smaller in size, and requires less power consumption than conventional wavelength filter devices.

In one embodiment, a tunable wavelength filter device includes a light wave circuit having an input light wave path, an output light wave path, and a plurality of reflector elements between the input light wave path and the output light wave path that separates one or more wavelengths of an inputted light wave spectrum. A tuner component is positioned on the light wave circuit between the input light wave path and the output light wave path.

The wavelength filter device, in the absence of the tuner component, is designed to output a light wave having a predetermined wavelength on the output light wave path. The tuner component alters the light wave path through the light wave circuit so as to change the resulting wavelength of the light wave(s) that is output from the light wave circuit on the output light wave path. Therefore, rather than installing a new wavelength filter device when a different output is desired, a standard wavelength filter device can be provided and then tuned to output the desired wavelength(s) by using an appropriate tuner component.

In another embodiment, a tunable holographic Bragg reflector device is provided. The device includes a light wave circuit having an input light wave path, an output light wave path, and a plurality of holographic Bragg reflector elements between the input light wave path and the output light wave path that are designed to receive an inputted light wave spectrum and separate out a pre-specified wavelength of light from the inputted light wave spectrum to be sent out of the tunable holographic Bragg reflector device on the output light wave path. A tuner component is positioned on the light wave circuit between the input light wave path and the output light wave path, wherein the tuner component is designed to alter the resulting wavelength of light that is output on the output light wave path.

In yet another embodiment, a method for tuning a holographic Bragg reflector device is provided. The method includes arranging a tuner component on the light wave circuit between the input light wave path and the output light wave path so as to alter a resulting wavelength of light that is output on the output light wave path.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized without departing from the spirit and scope of the claims. The following detailed description is, therefore, not to be taken in a limiting sense.

The embodiments described herein can be used in a variety of optical communication systems for filtering information signals sent in an optical format, for example Optical Code Division Multiple Access (OCDMA) or Dense Wavelength Division Multiplexing (DWDM) formats. For sake of convenience the concepts are described as applied to a holographic Bragg reflector device. However, the inventive concepts can be applied to other wavelength filter devices in which a tuned output is desirable.

Figure 1:
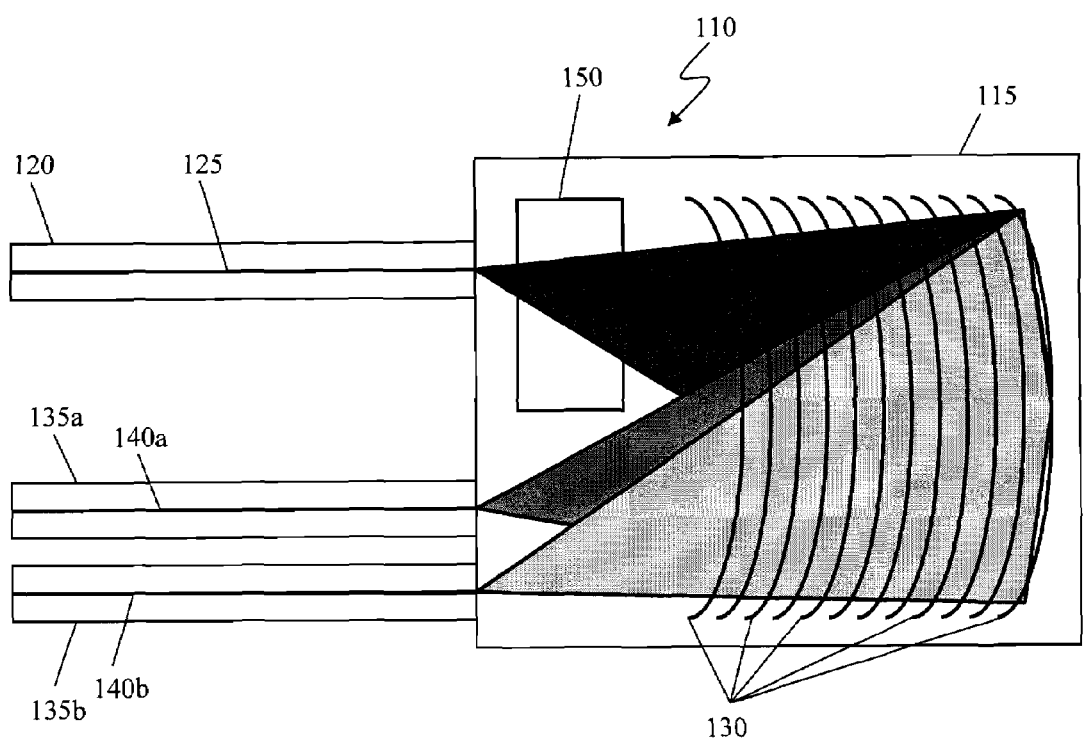
FIG. 1 is a perspective view of a tunable wavelength filter device according to one embodiment.

FIG. 1 is a perspective view of a holographic Bragg reflector device 110 according to one embodiment. The device 110 comprises a planar light wave circuit 115 with an optical input light wave path 120 for inputting a light wave spectrum 125 that comprises a plurality of different wavelengths, and optical output light wave paths 135a, b on which light waves 140a, 140b of predetermined wavelengths are output from the device 110. A plurality of holographic Bragg reflector elements 130 are provided on the light wave circuit 115 between the input 120 and the outputs 135a, 135b. The reflector elements 130 are designed to create constructive and deconstructive interference patterns of the inputted light wave spectrum 125 in order to separate one or more pre-specified wavelengths of the inputted light wave spectrum 125. The planar wave circuit 115 can be, for example, integrated onto a photonic chip.

The device 110 also includes a tuner component 150 that is positioned on the light wave circuit 115 between the input light wave path 120 and the outputs 135a, 135b. FIG. 1 illustrates the tuner component 150 positioned in the light path upstream of the reflector elements 130. However, as explained below with respect to FIGS. 2A-2D, other positions of the tuner component are possible.

The tuner component 150 has an index of refraction that is designed to alter the light path through the circuit 115, thereby changing the wavelength(s) of the light waves 140a, 140b that are output on the outputs 135a, b. The tuner component 150 can be any material providing a desired index of refraction that is placed on the circuit 115 in the light path to tune the circuit 115 to output the desired wavelength(s). For example, the tuner component can comprise a mass of polymer material, such as an optical epoxy, or a fluid or gel that is contained in a chamber, such as an index matching fluid or gel.

In the embodiment shown in FIG. 1, the tuner component 150 is positioned such that the inputted light wave spectrum 125 passes through the tuner component 150 before being refracted by the plurality of reflector elements 130. As the light wave spectrum 125 passes through the tuner component 150, the light path is altered. Accordingly, the location where the light wave spectrum 125 contacts the plurality of reflector elements 130 is shifted, causing different constructive and deconstructive patterns to form compared to when no tuner component is present. This causes a change in the wavelength(s) that is ultimately output from the device 110.

While FIG. 1 illustrates the device 110 as having two outputs 135a, 135b, the device 110 can comprise a single output path, as shown in FIGS. 2A-2D, or more than two outputs.

Figure 2A:
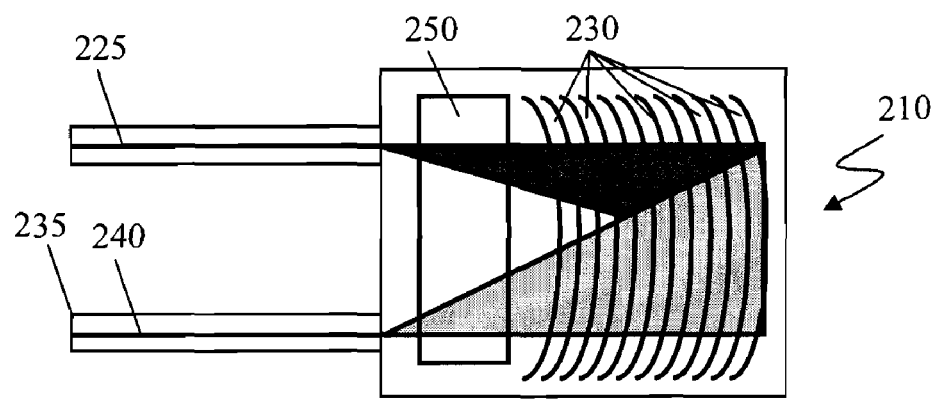
FIGS. 2A-2D each provides a perspective view of a different embodiment of a tunable wavelength filter device.

FIGS. 2A through 2D provide perspective views of different embodiments of a holographic Bragg reflector device with tuner components positioned at different locations in the light path within the device. In FIG. 2A, a holographic Bragg reflector device 210 includes a tuner component 250 that is positioned both in the input path and the output path. The tuner component refracts the light wave spectrum 225 prior to the light wave spectrum 225 reaching a plurality of reflector elements 230, and refracts the light wave from the plurality of reflector elements 230 to result in the light wave 240 output on the output 235 having the desired wavelength.

Figure 2B:
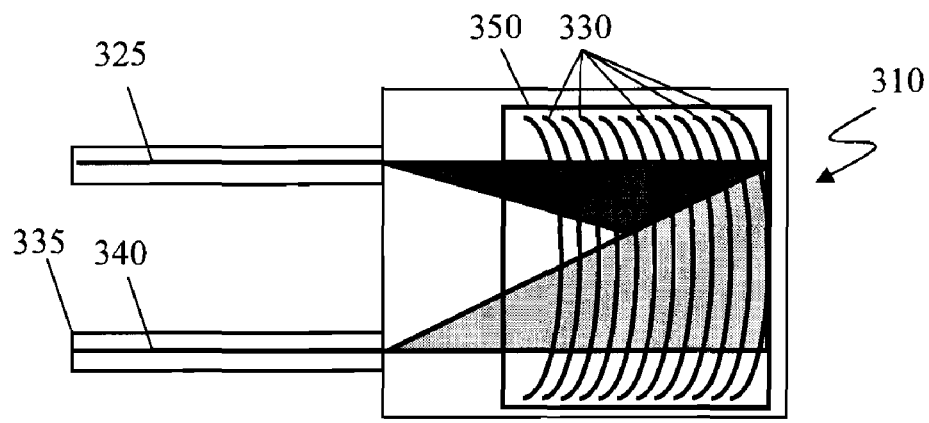

FIG. 2B illustrates a holographic Bragg reflector device 310 comprising a tuner component 350 that is positioned such that it is interspersed with a plurality of reflector elements 330. In this embodiment, an input light wave spectrum 325 is refracted essentially simultaneously by the tuner component 350 and the plurality of reflector elements 330. The resulting light wave 340 having the desired wavelength is then output on the output path 335.

Figure 2C:
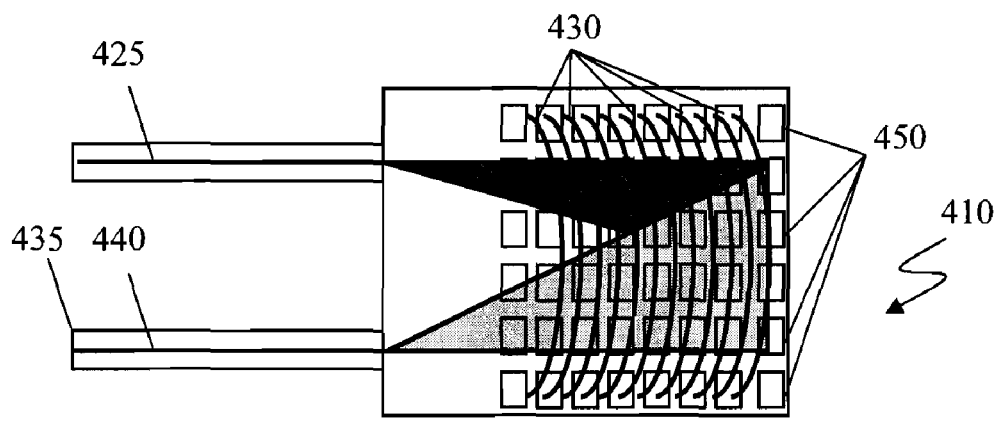

FIG. 2C illustrates a holographic Bragg reflector device 410 comprising a plurality of tuner components 450 positioned so as to be interspersed with a plurality of reflector elements 430. An input light wave spectrum 425 is refracted essentially simultaneously by the plurality of tuner components 450 and the elements 430, and the resulting light wave 440 having the desired wavelength is then output on the output path 435.

Figure 2D:
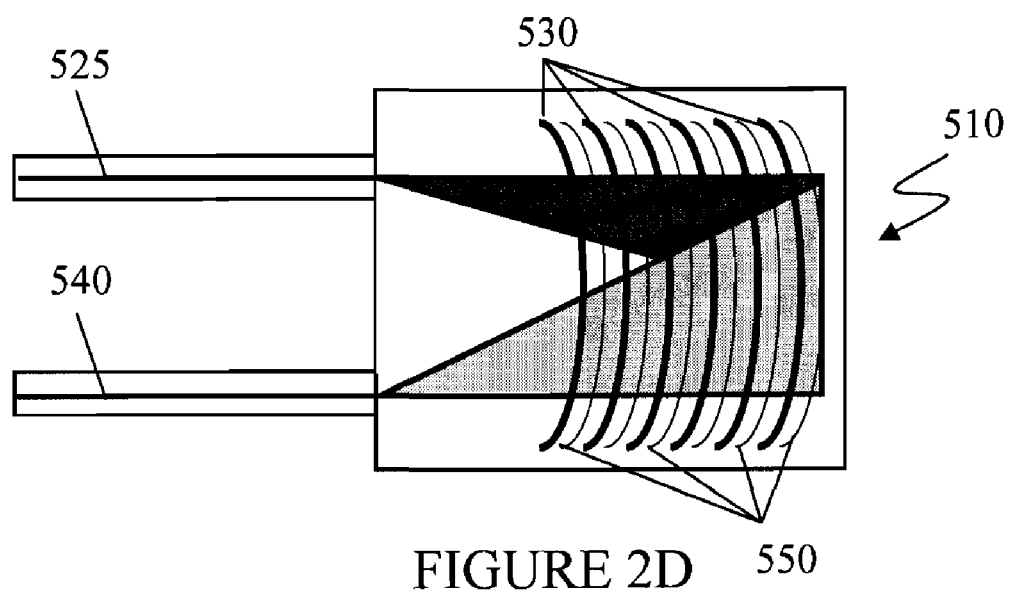

FIG. 2D illustrates a holographic Bragg reflector device 510 comprising a plurality of tuner components 550 positioned so as to be interspersed, for example alternating, with a plurality of reflector elements 530. An input light wave spectrum 525 is refracted essentially simultaneously by the plurality of tuner components 550 and the elements 530, and the resulting light wave 540 having the desired wavelength is then output on the output path.

In the embodiments described herein, the device can be initially tuned by applying an appropriate tuner component at an appropriate location in the light path. If a new output wavelength is desired, the device can be re-tuned to output the new wavelength. One way to re-tune the device is to replace the tuner component with a new tuner component that results in the desired wavelength. The device can also be re-tuned by altering the index of refraction of the tuner component. For example, in the case of a polymeric tuner component, a polymer material having a different index of refraction can be added to the existing polymeric tuner component, with the combined index of refraction of the two polymeric materials resulting in the output of the desired wavelength. In the case of a fluidic tuner component, the fluid can be replaced with a new fluid having a different index of refraction, or the existing fluid can be combined with another fluid to create a blended fluid having an index of refraction that results in the desired wavelength.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A tunable wavelength filter device comprising:
   a light wave circuit that includes an input light wave path, an output light wave path, and a plurality of reflector elements between the input light wave path and the output light wave path that separate one or more wavelengths of an inputted light wave spectrum; and
   a tuner component that tunes the tunable wavelength filter device to output a desired wavelength of the inputted light wave spectrum, the tuner component comprising an interchangeable light path substance positioned on the light wave circuit between the input light wave path and the output light wave path;
   wherein the interchangeable light path substance is a polymer material that has an index of refraction that guides the light path of the inputted light wave spectrum as it passes through the interchangeable light path substance to output a desired wavelength of the inputted light wave spectrum, and
   wherein the tuner component is retunable by replacing the interchangeable light path substance with a second interchangeable light path substance having a different index of refraction or by combining the interchangeable light path substance with the second interchangeable light path substance.

2. The device of claim 1, wherein the plurality of reflector elements are holographic Bragg reflector elements.

3. The device of claim 1, wherein the tuner component comprises a chamber and the interchangeable light path substance is a fluid or a gel contained in the chamber.

4. The device of claim 1, wherein the tuner component is devoid of gratings.

5. The device of claim 1, wherein the tuner component is positioned on the light wave circuit such that the inputted light wave spectrum passes through the tuner component before reaching the plurality of reflector elements.

6. The device of claim 1, wherein the tuner component is positioned on the light wave circuit such that a light wave separated by the reflector elements passes through the tuner component before reaching the output light wave path.

7. The device of claim 1, comprising a plurality of the tuner components interspersed with the plurality of reflector elements.

8. A tunable holographic Bragg reflector device comprising:

a light wave circuit that includes an input light wave path, an output light wave path, and a plurality of holographic Bragg reflector elements between the input light wave path and the output light wave path that are designed to receive an inputted light wave spectrum and separate out a pre-specified wavelength of light from the inputted light wave spectrum to be sent out of the tunable holographic Bragg reflector device on the output light wave path; and a tuner component that tunes the tunable wavelength filter device to output a desired wavelength of the inputted light wave spectrum, the tuner component comprising an interchangeable light path substance positioned on the light wave circuit between the input light wave path and the output light wave path, wherein the interchangeable light path substance has an index of refraction that guides the light path of the inputted light wave spectrum as it passes through the interchangeable light path substance to output a desired wavelength of the inputted light wave spectrum, and wherein the interchangeable light path substance is positioned on the light wave circuit, and is configured, to enable the interchangeable light path substance to be retuned by replacing the interchangeable light path substance with a second interchangeable light path substance having a different index of refraction or by combining the interchangeable light path substance with the second interchangeable light path substance.

9. The device of claim 8, wherein the tuner component comprises a chamber and the interchangeable light path substance is a fluid or a gel contained in the chamber.

10. The device of claim 8, wherein the interchangeable light path substance is a polymer material.

11. The device of claim 8, wherein the tuner component is positioned on the light wave circuit such that the inputted light wave spectrum passes through the tuner component before reaching the plurality of holographic Bragg reflector elements.

12. The device of claim 8, wherein the tuner component is positioned on the light wave circuit such that a light wave separated by the holographic Bragg reflector elements passes through the tuner component before reaching the output light wave path.

13. The device of claim 8, comprising a plurality of the tuner components interspersed with the plurality of holographic Bragg reflector elements.

14. A method of tuning a holographic Bragg reflector device that includes a light wave circuit, an input light wave path, an output light wave path, and a plurality of holographic Bragg reflector elements between the input light wave path and the output light wave path, comprising:

arranging a tuner component comprising an interchangeable light path substance on the light wave circuit between the input light wave path and the output light wave path, the interchangeable light path substance having an index of refraction so as to guide a resulting wavelength of light passing through the interchangeable light path substance towards the output light wave path; and retuning the tuner component by replacing the interchangeable light path substance with a second interchangeable light path substance having a different index of refraction or adding the second interchangeable light path substance to the interchangeable light path substance.

15. The method of claim 14, comprising arranging the tuner component so that a light wave spectrum input via the input light wave path passes through the tuner component before reaching the plurality of holographic Bragg reflector elements.

16. The method of claim 14, comprising arranging the tuner component so that a light wave separated by the holographic Bragg reflector elements passes through the tuner component before reaching the output light wave path.

17. The device of claim 8, wherein the tuner component is devoid of gratings.

\* \* \* \* \*